US008351167B2

(12) United States Patent (10) Patent No.: US 8,351,167 B2
Wolfus et al. (45) Date of Patent: Jan. 8, 2013

(54) FAULT CURRENT LIMITERS (FCL) WITH THE CORES SATURATED BY SUPERCONDUCTING COILS

(75) Inventors: Shuki Wolfus, Kiryat-Ono (IL); Alexander Friedman, Tel Aviv (IL); Yosef Yeshurun, Ganei Tikvah (IL); Vladimir Rozenshtein, En Harod Ihud (IL); Zvi Bar-Haim, En Harod Ihud (IL)

(73) Assignees: Bar Ilan University, Ramat Gan (IL); Ricor Cryogenic & Vacuum Systems, En Harod Ihud (IL)

( * ) Notice: Subject to any disclaimer, the term of this patent is extended or adjusted under 35 U.S.C. 154(b) by 1023 days.

(21) Appl. No.: 12/066,228

(22) PCT Filed: Sep. 7, 2005

(86) PCT No.: PCT/IL2005/000948
§ 371 (c)(1),
(2), (4) Date: Sep. 2, 2008

(87) PCT Pub. No.: WO2007/029224
PCT Pub. Date: Mar. 15, 2007

(65) Prior Publication Data
US 2009/0021875 A1 Jan. 22, 2009

(51) Int. Cl.
*H02H 9/00* (2006.01)
(52) U.S. Cl. .......................................................... 361/19
(58) Field of Classification Search ...................... 361/19
See application file for complete search history.

(56) References Cited

U.S. PATENT DOCUMENTS

| 3,219,918 | A | * | 11/1965 | Trench | 323/253 |
| 3,671,810 | A | * | 6/1972 | Barnes et al. | 361/58 |
| 4,045,823 | A | * | 8/1977 | Parton | 361/58 |
| 4,155,034 | A | * | 5/1979 | Logan | 323/337 |

(Continued)

FOREIGN PATENT DOCUMENTS

GB 392865 A 5/1933

(Continued)

OTHER PUBLICATIONS

Raju et al. "A current limiting device using superconducting d.c. bias: applications and prospects," IEEE Transactions on Power Apparatus & Systems 101:3173-3177 (1982.).

(Continued)

*Primary Examiner* — Ronald W Leja
(74) *Attorney, Agent, or Firm* — Browdy and Neimark, PLLC (57) ABSTRACT

A current limiting device (30, 40, 50, 60) comprising for each phase of an AC supply a closed magnetic core (31) of reduced volume and mass having first and second pairs of opposing limbs (32*a*, 32*b*; 33*a*, 33*b*), and at least one AC coil (35*a*, 35*b*) enclosing opposing limbs (33*a*, 33*b*) of the magnetic core (31) and adapted for series connection with a load. A superconducting DC bias coil (34) encloses a limb (32*a*, 32*b*) of the magnetic core (31) for saturating each of the opposing limbs (33*a*, 33*b*) in opposite directions by the bias coil (34). Under fault conditions, the AC flux in at least one limb counteracts the DC bias flux, bringing the limb out of saturation. Preferably, current is reduced in the DC bias coils thus bringing both opposing limbs of the core out of saturation.

15 Claims, 6 Drawing Sheets

U.S. PATENT DOCUMENTS

| | | | | |
|---|---|---|---|---|
| 4,257,080 A * | 3/1981 | Bartram et al. | ............... | 361/19 |
| 6,611,408 B2 * | 8/2003 | Hanley et al. | ............... | 361/58 |
| 7,649,721 B2 * | 1/2010 | Husband et al. | ............... | 361/19 |
| 8,169,756 B2 * | 5/2012 | Husband et al. | ............... | 361/19 |
| 2003/0117228 A1 | 6/2003 | Haugs et al. | | |
| 2004/0032315 A1 * | 2/2004 | Illingworth | ............... | 336/212 |
| 2006/0158803 A1 * | 7/2006 | Friedman et al. | ............... | 361/58 |
| 2007/0230076 A1 * | 10/2007 | Husband et al. | ............... | 361/58 |
| 2009/0021875 A1 * | 1/2009 | Wolfus et al. | ............... | 361/58 |
| 2010/0046125 A1 * | 2/2010 | Husband et al. | ............... | 361/19 |

FOREIGN PATENT DOCUMENTS

| | | |
|---|---|---|
| JP | 2002118956 A | 4/2002 |
| WO | 2004068670 A | 8/2004 |

OTHER PUBLICATIONS

Jin et al. "Operating principle of a high 10 T-c superconducting saturable magnetic core fault current limiter". Physica C, 282, Part 4:2643-2644 (1997).

Jin et al. "Magnetic saturable reactor type HTS fault current limiter for electrical application". Physica C, 341-348: 2629-2630. (2000).

Keilin et al. "Model of HTS three-phase saturated core fault current limiter", IEEE Transactions on Applied Superconductivity) 10:836-839 (2000).

R. F. Giese, "Fault-cunent limiters-A second look," Argonne Nat. Lab., Argonne, USA Mar. 16, 1995.

* cited by examiner

FAULT CURRENT LIMITERS (FCL) WITH THE CORES SATURATED BY SUPERCONDUCTING COILS

FIELD OF THE INVENTION

This invention relates to superconducting current limiting devices for AC electric grid.

References

In the following description, reference will be made to the following publications:

[1] B. P. Raju, K. C. Parton, T. C. Bartram, "A current limiting device using super-conducting d.c. bias: applications and prospects," *IEEE Transactions On Power Apparatus & Systems*, vol. 101, pp. 3173-3177, 1982.
[2] J. X. Jin, S. X. Dou., C. Grantham, and D. Sutanto "Operating principle of a high T-c superconducting saturable magnetic core fault current limiter". *Physica C*, 282, Part 4: p. 2643-2644, 1997.
[3] J. X. Jin, S. X. Dou., C. Cook, C. Grantham, M. Apperley, and T. Beals, "Magnetic saturable reactor type HTS fault current limiter for electrical application". *Physica C*, 2000. 341-348: p. 2629-2630.
[4] V. Keilin, I. Kovalev, S. Kruglov, V. Stepanov, I. Shugaev, V. Shcherbakov, I. Akimov, D. Rakov, and A. Shikov, "Model of HTS three-phase saturated core fault current limiter", *IEEE Transactions on Applied Superconductivity*, vol. 10, pp. 836-839, 2000.
[5] R. F. Giese, "Fault-current limiters—A second look," Argonne Nat. Lab., Argonne, USA Mar. 16, 1995.
[6] WO 2004/068670 (Yosef Yeshurun et al.) published Dec. 8, 2004 "Fault current limiters (FCL) with the cores saturated by superconducting coils."

BACKGROUND OF THE INVENTION

Fault Current Limiters (FCL) are expected to be among the first and most important power applications of High Temperature Superconductors (HTS). The advantages of HTS-FCL as compared to conventional current limiting devices, used world-wide in national electricity circuits, are their quick response and fast recovery, relatively low energy dissipation, tolerance to large fault currents and the possibility for virtually unlimited number of operations.

More particularly, the present invention relates to current limiting devices based on a superconducting coil with saturated core. In known designs, such a device comprises at least two coils with ferromagnetic cores for each phase connected in series with a load. On the cores there are superconducting bias coils connected to a DC power supply. At normal state the bias coils saturate the cores, and the impedance of the current limiter is very low. When a fault occurs, the current sharply increases and the cores are driven out of saturation at alternate half-cycles. As a result the impedance of the current limiter builds up and limits the current increase.

Two main designs of a saturated core reactor for limiting a fault current in electric power system are proposed in U.S. Pat. No. 3,219,918, incorporated herein by reference. One design includes two AC coils placed on two outer legs of an E-core. Another design employs a single AC coil that encompasses two legs belonging to different cores that are saturated in opposite directions. In this patent DC coils made of copper are envisaged.

In U.S. Pat. No. 3,671,810 incorporated herein by reference this principle has been proposed for transient current limiting in electronic circuits. U.S. Pat. No. 4,045,823 incorporated herein by reference to K. C. Parton et al describes a current limiting device for a power alternating current system. The current limiter has for each phase a pair of saturable reactors whose coils are wound in opposite directions relative to superconducting bias coils. U.S. Pat. No. 4,117,524 incorporated herein by reference also to K. C. Parton et al. describes a modified form of current limiter having a screen of conductive material surrounding the bias winding to shield it against the alternating magnetic field. In this patent, one common bias coil is used for two reactors. Raju et al. [1] realized their current limiting device with a superconducting bias coil operating in a liquid helium bath and demonstrate its efficiency. U.S. Pat. No. 4,257,080 (Bartram et al.) incorporated herein by reference describes a further improvement of this current limiting device by placing the common bias coil on the central limbs of three or six cores of a three-phase reactor. In the three mentioned patents additional air-gapped cores are placed in the circuit of the bias coil. These cores are necessary for decreasing alternating current in DC circuit caused by transformer coupling between the AC coils and bias coils.

Several laboratory scale models of saturated core current limiters have been realized with superconducting coils made of high-temperature superconductors (HTS) [2, 3, 4]. These one-phase [2, 3] and three-phase [4] devices were built according to the design proposed in the above-mentioned US patents, the contents of all of which are incorporated herein by reference.

The current limiter with saturated core has decisive advantages as compared with other superconducting current limiters:

its current limiting effect is not dependent on transition of the superconducting element to normal state, i.e. superconducting state is maintained all the time and no recovery time is necessary to return to ready state after fault. Moreover, there is no dissipation of energy associated with transition of the super-conducting element to normal state;

the superconducting element is a coil made of standard superconducting wire manufactured on an industrial scale;

the superconducting coil operates in DC mode and is exposed to low AC magnetic fields.

Known designs of FCL with saturated cores have essential shortcomings that prevent development and realization of this type of FCL. Its weakest points are the large weight and dimensions that are about twice the weight and dimensions of a transformer of the same power [5]. Also, in known FCLs of this type the impedance of the AC coils does not reach its maximum possible value because the bias coils produce magnetic flux in the cores that reduces the impedance of the AC coils. This feature is necessary at normal conditions but has a negative effect at fault conditions. Furthermore, at fault conditions the alternating magnetic field of the AC coils affects the superconducting bias coil, decreasing its critical current. In known designs, a cryostat with bias coils is placed in the window of the core thus increasing its size. The size of the magnetic core is defined mostly by its cross-section, which in turn is determined by the required voltage drop on the FCL during a fault. This voltage is proportional to the product of the cross-section of the core with the number of turns in the AC coil. The number of turns is limited by allowable voltage drop on FCL at normal operation.

In the above-mentioned WO 2004/068670, we propose new designs that address these considerations. First, instead of closed magnetic cores, open cores (rods) are used. The weight of such core is less than of the closed core. Second, an additional feedback coil is used to compensate the magnetic flux of the bias coil at the fault regime thus increasing the impedance of the FCL limiting the fault current. Use of the additional feedback coil changes the properties of FCL in such a way that both AC coils operate at fault regime during both half cycles. It allows the cross-section of the core to be decreased because the required voltage drop on the FCL is distributed between two coils instead of one at each half-cycle as occurs in previous designs.

However, the transformer coupling inherent in known configurations induces an AC voltage on the superconducting DC bias coil thus superimposing an AC current component in the DC circuit. Moreover, the same effect inheres also to the additional DC circuit of the feedback coil. In all state of art designs the bias coil has a number of turns close to the number of turns in the AC coil and thus the voltage on the bias coil has the same order of magnitude as on the AC coil, i.e. the voltage of the grid at the time of fault.

JP2002118956A2 discloses a current limiter that includes a pair of first and second magnetic cores facing each other, a closed magnetic circuit formed of permanent magnets jointed between the first and second magnetic cores, and a coil by winding a conductor around the first and second magnetic cores, through which saturation magnetic fluxes developed by the permanent magnets flow. The first and second magnetic cores, where the directions of saturation magnetic fluxes are opposite to each other, are formed so that magnetization is reversed alternately by current passing through the coil at short-circuit for each half period of the current.

It would therefore be desirable to provide an improved design of FCL having a superconducting bias coil wherein this drawback is addressed without compromising the advantages afforded by the configuration proposed in WO 2004/068670.

SUMMARY OF THE INVENTION

It is therefore an object of the present invention to provide an improved design of FCL with saturated core that includes at least one superconducting DC bias coil placed on a single closed ferromagnetic core, which selves as open core for a single AC coil. Such design of a current limiter allows building the FCL with saturated core having a small mass and dimensions and also reduces or eliminates the transformer coupling between the AC coil and the superconducting DC bias coil(s) thus decreasing AC voltage on the super-conducting DC bias coil(s).

A further object of the invention is to provide an improved current limiter with saturated core where the bias field is decreased or eliminated at the time of a fault by disconnecting the bias coils from their power supply and connecting them in a voltage limiting circuit with energy absorbing elements controlling maximal voltage on the coils. The disconnection is realized by a switching device, controlled by the voltage drop on the AC coil, that also restores the DC coil circuit after disconnecting the fault.

Yet another object of the invention is to provide switching of the DC circuit that connects two bias coil segments in opposite directions relative to an initial connection for preventing a possible transformer coupling effect at the time of fault.

Additional objectives of the present invention are:
to reduce the alternating magnetic field on the superconducting bias coils thus preventing a degradation of their critical current;
a to reduce the number of Ampère-turns of the bias coils without increasing the core size.

These objects are realized in accordance with a first aspect of the invention by a current limiting device for an AC supply, said current limiting device comprising for each phase of the AC supply:
a magnetic circuit forming an open magnetic core for at least one AC coil and forming a closed magnetic circuit for at least one superconducting DC bias coil that is adapted under non-fault conditions to bias the magnetic core into saturation so that each of the opposing limbs is saturated in opposite directions by the bias coil.

The magnetic circuit preferably comprises:
a closed magnetic core having a first pair of opposing limbs and a second pair of opposing limbs,
at least one AC coil enclosing opposing limbs of the magnetic core and being adapted to be connected in series with a load, and
at least one superconducting DC bias coil enclosing at least one limb of the magnetic core and being adapted under non-fault conditions to bias the magnetic core into saturation so that each of the opposing limbs is saturated in opposite directions by the bias coil.

Since the AC coil is commonly wound externally on both limbs of the core, the AC coil sees an open core, opposing limbs of which are subjected to AC flux in the same direction, which will alternate during alternate half-cycles of the AC current. As against this, the DC bias coil is wound internally on the core in a way that forms a closed magnetic circuit for the DC flux and affects the magnetic permeability of the complete core. Specifically, the DC bias coil ensures that the core is magnetized whereby under non-fault conditions its magnetic permeability is low. Moreover, since the flux produced by the DC bias coil encircles the four limbs of the magnetic core in a fixed angular direction (clockwise or anticlockwise) determined by the direction of the DC current, it always acts in the same direction as the AC flux in one limb and in the opposite direction of the AC flux in the opposite limb. The dimensions of the magnetic core and the number of turns of the AC coil are so designed that, even under maximum fault conditions, the current in the AC coil does not bring the core into saturation. Therefore, even under maximum fault conditions, the AC flux adds to the saturation produced by the DC bias coil in one limb; while in the opposite limb, the AC flux acts to bring the limb out of saturation produced by the DC bias coil. The limb that remains in saturation exhibits low magnetic permeability, while the limb that is no longer saturated exhibits high magnetic permeability. What this means is that, in effect, under fault conditions some of the cross-sectional area of the magnetic core always contributes to high coil impedance and serves, thereby, to resist the fault.

Such an arrangement, whereby the AC coil is wound on an open magnetic core, while the DC bias coil is adapted under non-fault conditions to bias opposing limbs of the magnetic core into saturation in opposite directions, has not been proposed previously and allows the effective cross-sectional area of the magnetic core and/or the Ampère-tuns in the DC bias coil to be reduced.

In order to improve the efficiency of the device and bring the whole of the magnetic core out of saturation under fault conditions, the DC electric circuit of bias coils is preferably supplied with a current reduction unit that reduces the DC bias current during fault conditions. Better effectiveness is achieved where the current reduction unit is constituted by a switching unit that disconnects the bias coils from the DC power supply at the time of fault and includes the bias coils and energy absorbing elements that also limit the voltage on bias coils.

The switching enables the maximal voltage drop on the current limiter to be increased as compared with an FCL without switching because both legs of the core are out of saturation and the effective cross-section of the core is increased. An additional effect of using the switching unit (as a result of increasing the effective core permeability) is a strong reduction of the leakage AC field that has a negative influence on the superconducting bias coil. When the DC bias coils are energized, the DC flux always provides a positive offset to the AC flux in one of the limbs and a negative offset to the AC flux in the opposite limb. When the DC switches off, the magnetic picture becomes symmetric and all limbs of the magnetic core are unsaturated, thereby contribute to high magnetic impedance.

The switching unit allows the mass of the device to be reduced regardless of the type of core employed in the same way as described above in relation to the feedback coil.

In accordance with another aspect of the invention, there is provided a method for reducing mass of a current limiting device for an AC supply, said current limiting device comprising for each phase of the AC supply a magnetic circuit that offers low impedance under non-fault conditions and high impedance under fault conditions, said method comprising:

constructing the a magnetic circuit so as to form an open magnetic core for at least one AC coil and forming a closed magnetic circuit for at least one superconducting bias coil that is adapted under non-fault conditions to bias the magnetic core into saturation so that each of the opposing limbs is saturated in opposite directions by the bias coil;

whereby under fault conditions some of the cross-sectional area of the magnetic core always exhibits high permeability and serves, thereby, to resist the fault and allow the cross-sectional area of the at least one AC coil and magnetic core to be reduced.

Preferably, said method further comprises:

reducing current in the at least one superconducting DC bias coil during a fault condition thereby bringing the core out of saturation.

BRIEF DESCRIPTION OF THE DRAWINGS

In order to understand the invention and to see how it may be carried out in practice, some preferred embodiments will now be described, by way of non-limiting examples only, with reference to the accompanying drawings, in which.

DETAILED DESCRIPTION OF EXEMPLARY EMBODIMENTS

In the following description various embodiments are described. To the extent that many features are common to different embodiments, identical reference numerals will be employed to refer to components that are common to more than one figure.

Figure 1:
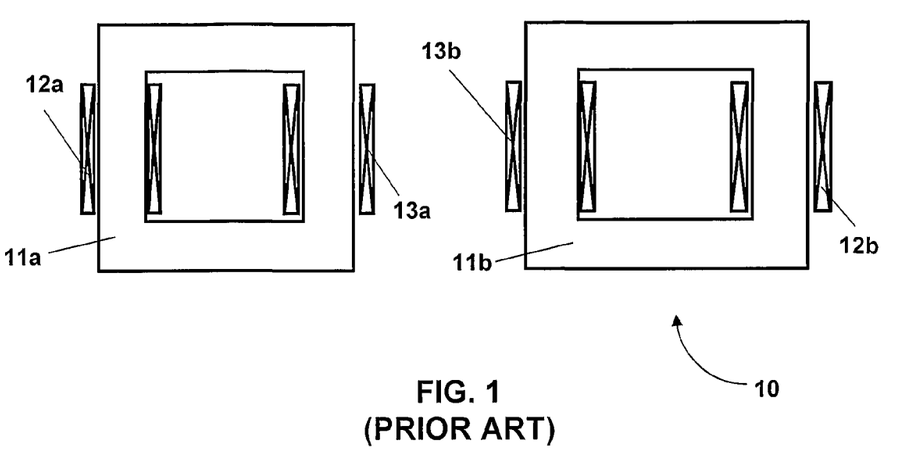
FIG. 1 shows pictorially a prior art closed core configuration of a saturated core single phase FCL.

In order more fully to appreciate the benefits of the invention, it will be instructive first to consider a typical prior art single phase FCL. To this end, FIG. 1 shows pictorially a prior art saturated core single phase FCL 10 having a magnetic circuit comprising a pair of closed magnetic cores 11a and 11b each supporting a respective AC coil 12a and 12b. The cores further support a pair of DC superconducting bias coils 13a and 13b.

Figure 2:
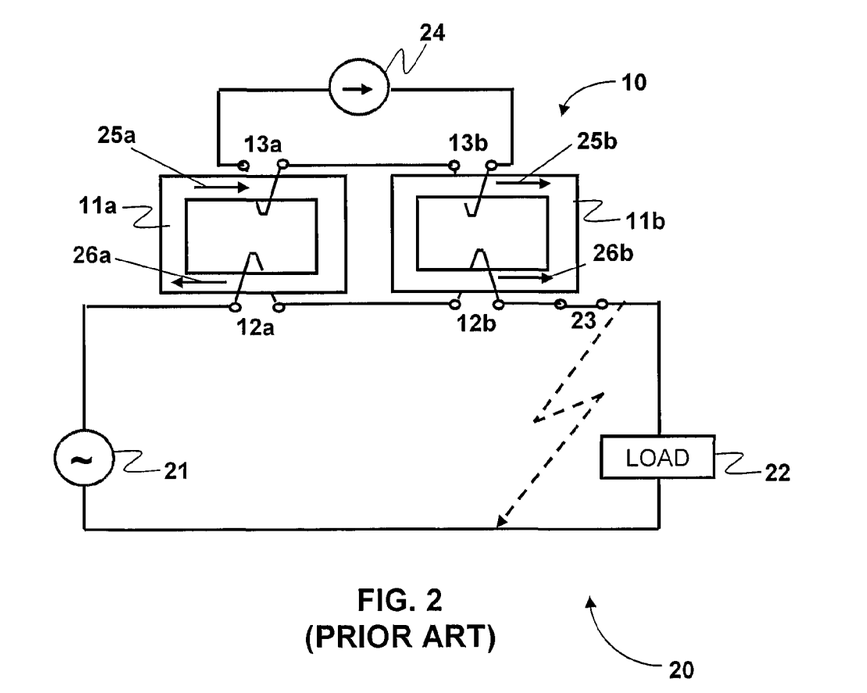
FIG. 2 is a schematic circuit diagram showing the prior art single phase FCL of FIG. 1 in use.

FIG. 2 shows schematically a circuit diagram of a system 20 showing the single phase FCL 10 in use. An AC supply 21, typically from the electric power grid, is connected to a load 22 via a circuit breaker 23. In series with the load 22 are connected the two AC coils 12a and 12b of the FCL 10. The respective superconducting bias coils 13a and 13b are connected to a DC power supply 24. At any moment the direction of the bias magnetic flux 25a in one core coincides with the direction of the magnetic flux 26a of the AC coil 12a whereas the direction of the bias magnetic flux 25b in the other core is opposite to the direction of the magnetic flux 26b of the AC coil 12b. Under normal conditions, the bias coils 25a and 25b saturate the respective cores 11a and 11b. Under fault conditions, the AC coils 12a and 12b draw the respective cores 11a and 11b out of saturation during opposite half cycles of the AC cycle, thereby causing their average inductance to increase, thus limiting the current increase.

Figure 3:
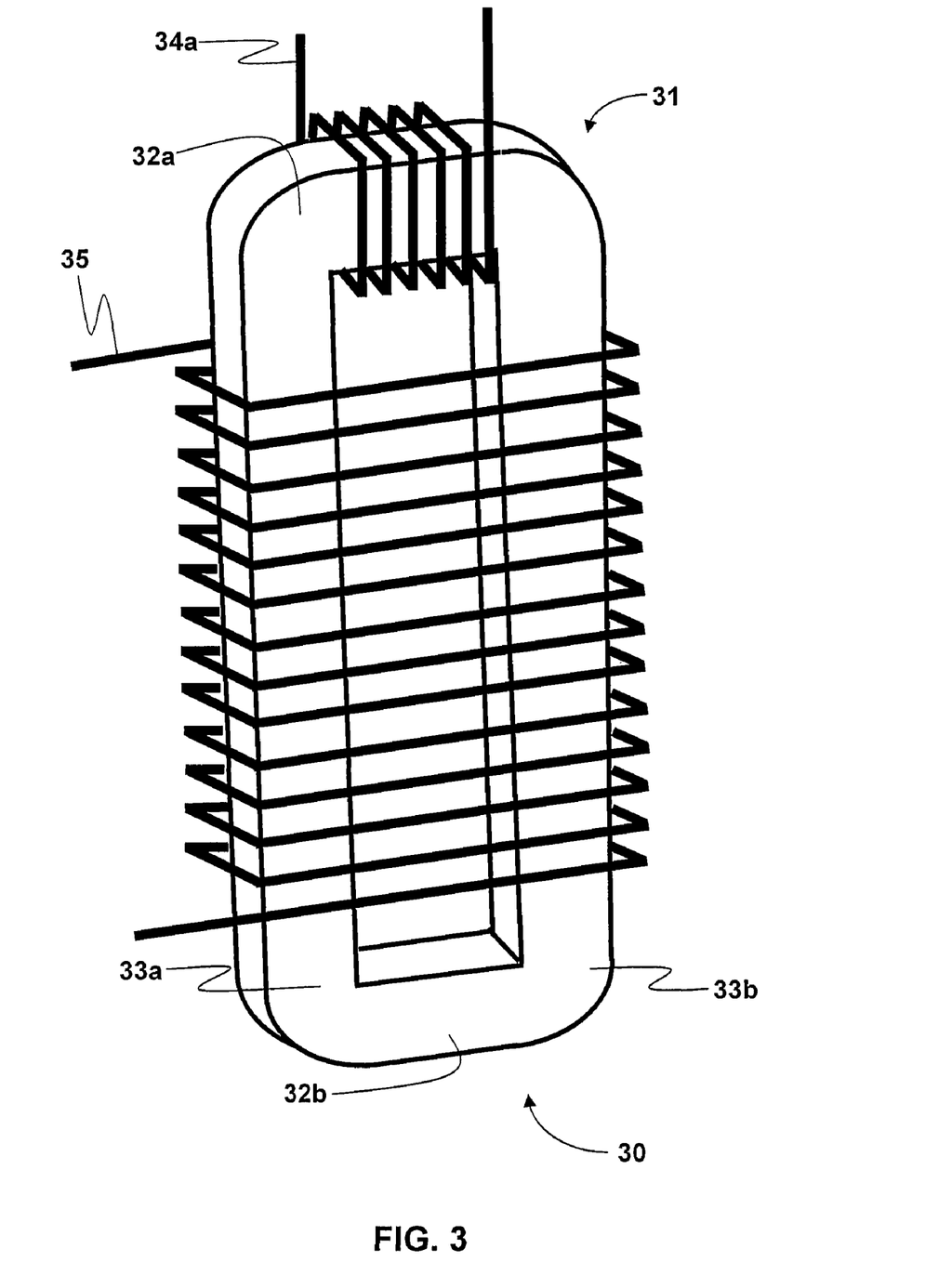
FIG. 3 shows a magnetic circuit having a closed core for a single phase FCL according to first exemplary embodiment of the invention.

FIG. 3 shows a single phase FCL 30 according to a first embodiment of the invention having a magnetic circuit comprising a single closed core 31 having opposing pairs of short legs 32a and 32b and long legs 33a and 33b as compared with the two closed cores of known designs as shown in FIG. 2. A single bias coil 34 is placed on one of the short legs 32a of the closed core 31. In this embodiment only one AC coil 35 is used that encircles the two long legs 33a and 33b of the core in such a way that the AC coil is disposed on the open magnetic core. An advantage of such an arrangement of transverse AC and DC bias coils is that transformer coupling of the coils is decreased, since the mutual inductance between the coils is ideally zero when the DC is off and the is AC fluxes in opposing limbs are equal and cancel each other at the centers of transverse limbs.

Figure 4:
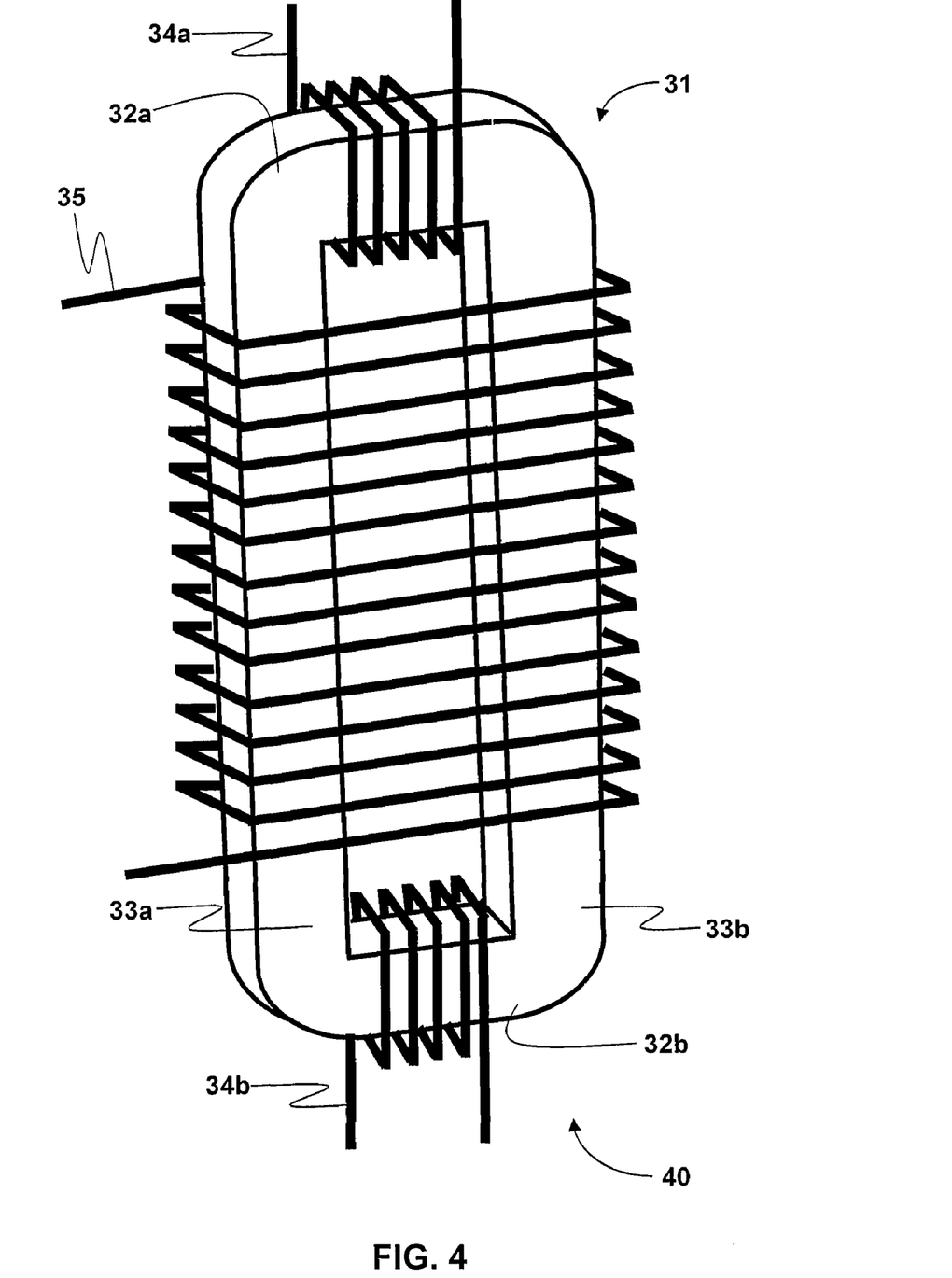
FIG. 4 shows the form of a core for a single phase FCL according to a second exemplary embodiment of the invention.

FIG. 4 shows an FCL 40 according to a second exemplary embodiment similar to the first embodiment in which, instead of the single bias coil 34, two bias coils 34a and 34b are placed on the opposite short legs 32a and 32b of the core thus enabling better saturation of the core with the same total number of Ampère-turns in the bias coils. This is achieved by splitting the original DC bias coil shown in FIG. 3 to two coils while maintaining the Ampère-turns. This is done because areas in the core, which are remote from the coil, are less saturated than areas close to the coil.

Figure 5:
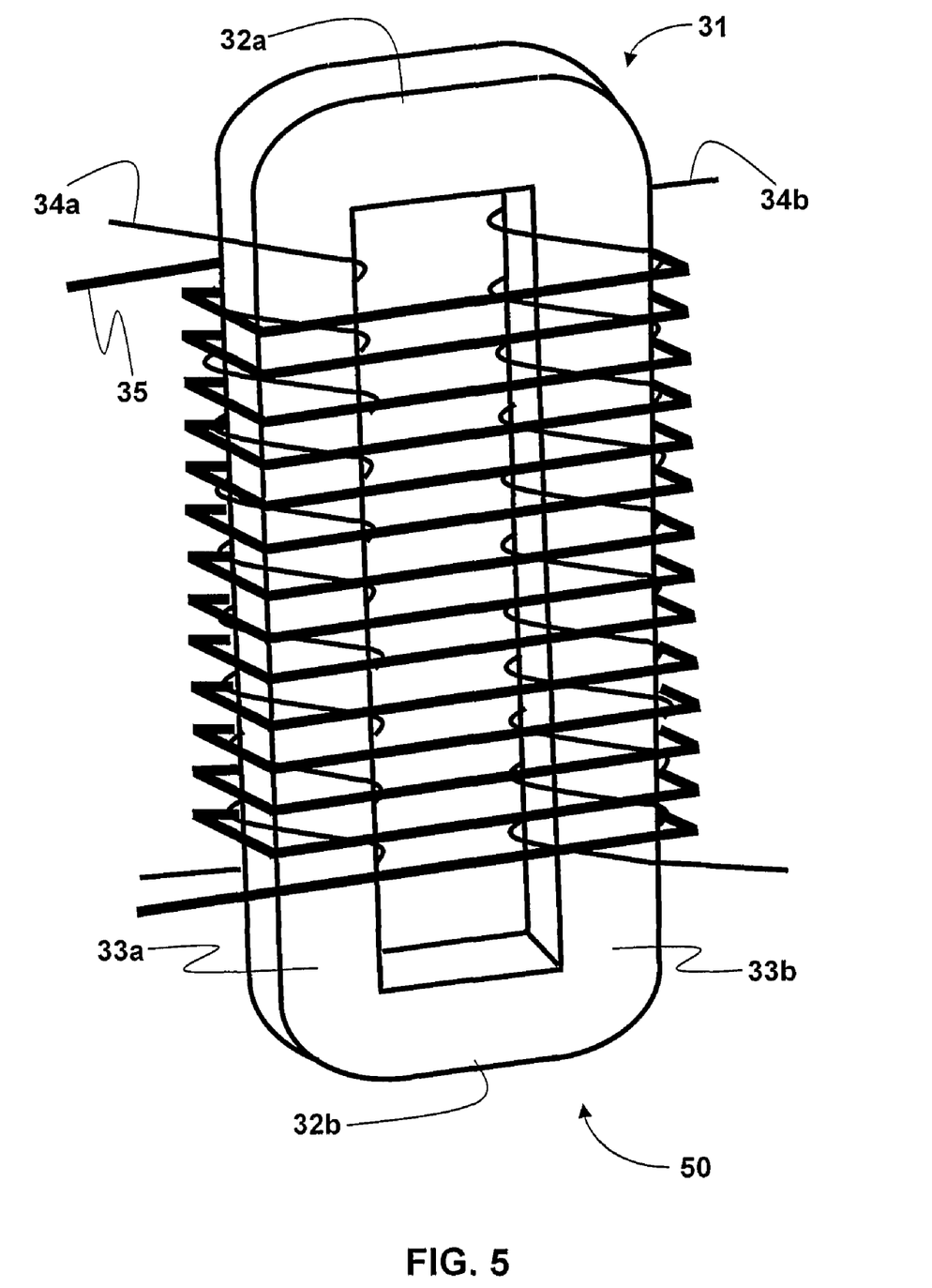
FIG. 5 shows a saturated core FCL according to a third exemplary embodiment of the invention.

FIG. 5 shows an FCL 50 according to another exemplary embodiment having an identical closed core 31 and a common AC coil 35 wound around the long legs 33a and 33b of the core. Two DC bias coils 34a and 34b are placed on the two long legs 33a and 33b of the core encompassed by the AC coil 35 thus enabling better saturation of the core with a smaller number of Ampère-turns of the bias coils.

Figure 6A:
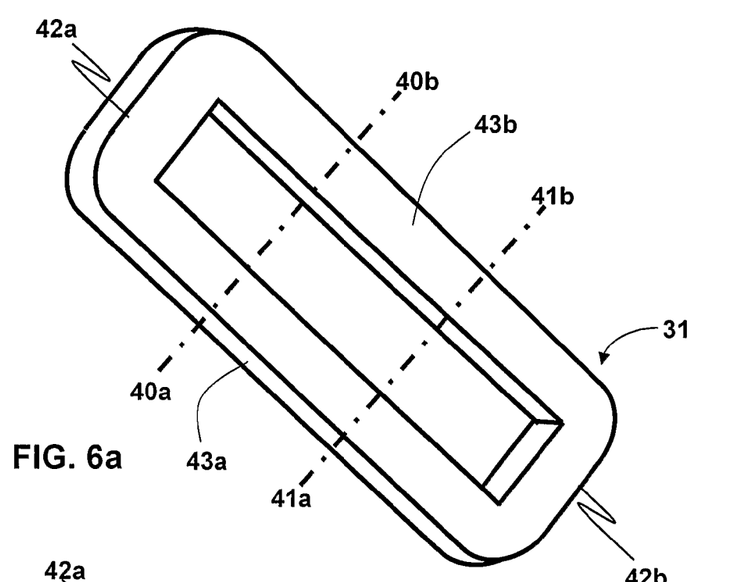
FIGS. 6a and 6b show a saturated core FCL according to a fourth exemplary embodiment of the invention.
Figure 6B:
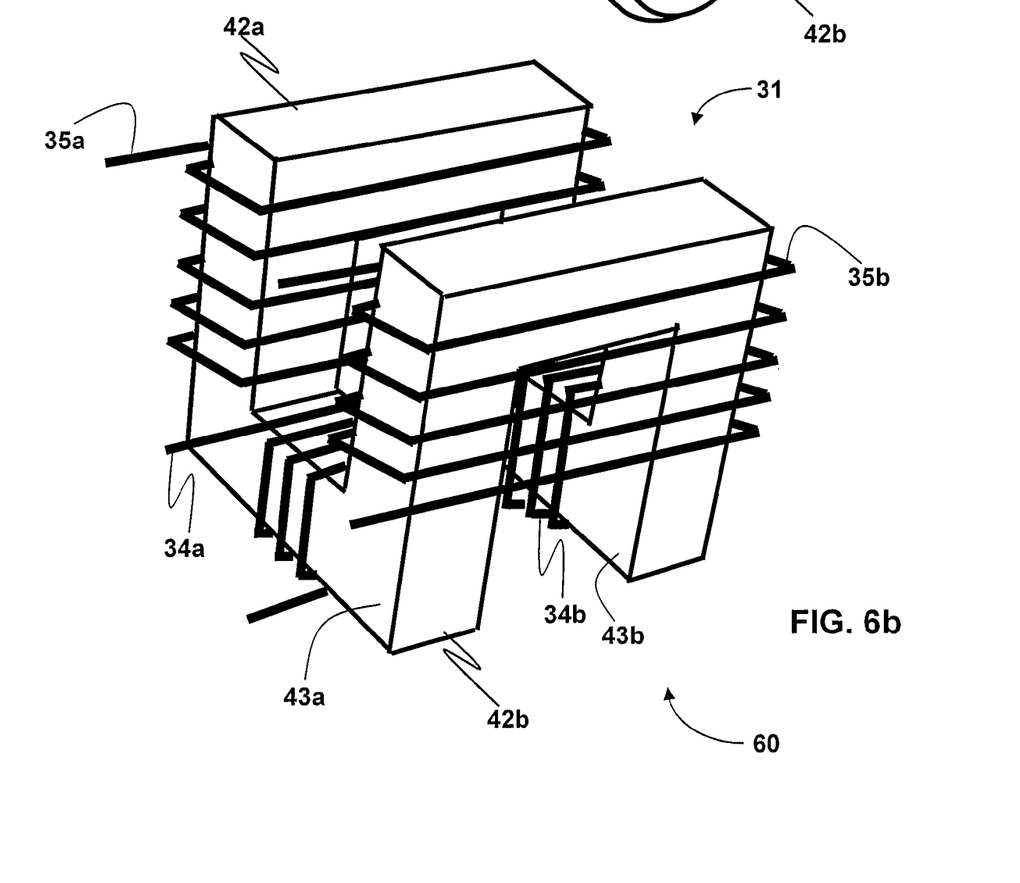

FIGS. 6a and 6b show an FCL 60 according to another exemplary embodiment having a closed magnetic core 31 that is formed by folding the core 31 shown in FIG. 6a and corresponding to that shown in FIG. 2, 3 or 4 about a pair of lines 40a-40b and 41a-41b so as to form a pair of spaced apart C-shaped cores 42a, 42b as shown in FIG. 6b. The C-shaped cores 42a, 42b face each other and the open ends of respective limbs of each core are magnetically coupled by legs 43a and 43b so as to form a closed magnetic circuit. Two bias coils 34a and 34b are wound on the legs 43a and 43b of the core. A first AC coil 35a encloses the opposite limbs of the C-shaped core 42a and a second AC coil 35b encloses the opposite limbs of the C-shaped core 42b. Such a configuration enables better saturation of the core than in the first embodiment shown in FIG. 3 and permits mounting both bias coils in a single cryostat unlike the embodiment of FIG. 4 where the two bias coils 34a and 34b are not capable of being inserted simultaneously into a common cryostat.

All the above-described embodiments are characterized by an AC coil 35 that encloses two limbs of the core magnetized to saturation in opposite directions by the DC coils. The core is never saturated by the AC coil alone but only by the DC bias coils which magnetize the "AC limbs" in opposite directions during opposite half cycles of the AC supply. As a result during a fault condition only one limb is driven out of saturation while the other limb is further drawn into deeper saturation if the DC bias coils continue to magnetize the core as is typically done in hitherto-proposed FCLs. However, if at the moment of fault, the current in the DC bias coil or coils 34 is reduced as is done in the invention, the maximal magnetic flux of the AC coil can be increased without saturating the core, thus increasing the maximal allowable voltage drop on the FCL. This effect is equivalent to decreasing the size of the core because during a fault both limbs are driven out of saturation. As a result, the cross-sections of the AC coil and the core can be reduced.

Figure 7:
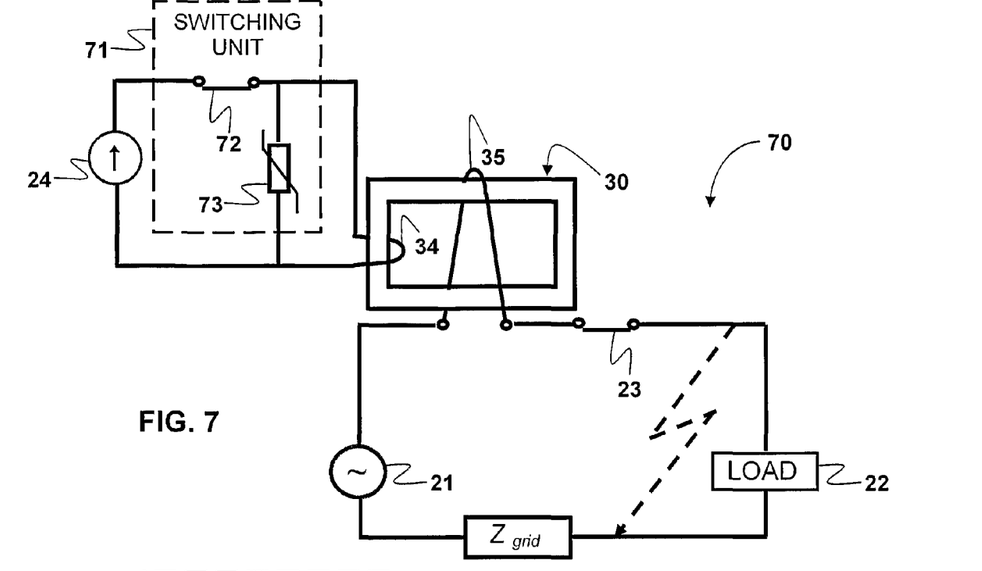
FIG. 7 is a schematic circuit diagram showing a single phase FCL according to an exemplary embodiment of the invention with a switching system for disconnecting power from the bias coils during a fault condition.

FIG. 7 is an exemplary schematic circuit diagram showing a system 70 that includes the FCL 30 shown in FIG. 3, wherein the bias coil 34 is energized by a DC supply 24 via a switching unit 71 that includes fast transistor switch 72 and an energy absorbing element 73 limiting maximal voltage in the electric circuit. The switching unit 71 thus serves to reduce current in the DC bias coil. Other elements are similar to the system 20 shown in FIG. 2 and have the same labeling. The system 70 operates as follows. At any moment the magnetic flux in both limbs will be directed to the left or to the right in the figure, since the AC coil 35 is commonly wound on both limbs. Under normal conditions, the DC bias coil 34 saturates the core so that limbs 33a and 33b are saturated in opposite directions, and the AC coil 35 thus exhibits low impedance. Under fault conditions, the current through the AC coil increases and, for so long as the DC bias coil 34 remains effective, during alternate half cycles, the AC coil 35 de-saturates a respective one of the limbs 33a and 33b. Therefore, the magnetic flux inside the AC coil 35 and its related inductance is defined by only one of the limbs 33a and 33b, i.e. by half of the full core cross-section. However, if under fault conditions the switching unit 71 disconnects the DC power source 24 from the DC bias coil 34, its current falls down, thereby de-saturating the complete core including limbs 33a and 33b, and doubling the effective cross-section of the core inside the AC coil 35 and increasing its impedance. This means that an equivalent current limiting effect can be achieved with such a topology having significantly reduced cross-sectional area of the AC coils and magnetic core compared with hitherto-proposed topologies.

The energy-absorbing element 72 is necessary to limit the voltage across the coil 34 during the time of switching. During this transient time regime the magnetic fluxes in limbs 33a and 33b are not equal and a fast change of the magnetic flux in limbs 32a and 32b may induce an alternating voltage/current on the bias coil(s) that might be harmful for the superconducting DC bias coils. The switching unit 71 not only disconnects the DC power source 24 from the DC bias coil 34 but also connects the two DC bias coils 34a, 34b or two segments of one DC bias coil 34 in opposite directions thus minimizing the overall AC voltage in the DC bias coils circuit and preventing AC current from flowing therein. Two energy-absorbing elements 83a, 83b are necessary for limiting the voltage on each DC bias coil or half coil. The voltage drop on the FCL triggers the switching circuit 71. When a fault occurs, this voltage changes abruptly by typically one order of magnitude allowing accurate and reliable fault detection.

Figure 8:
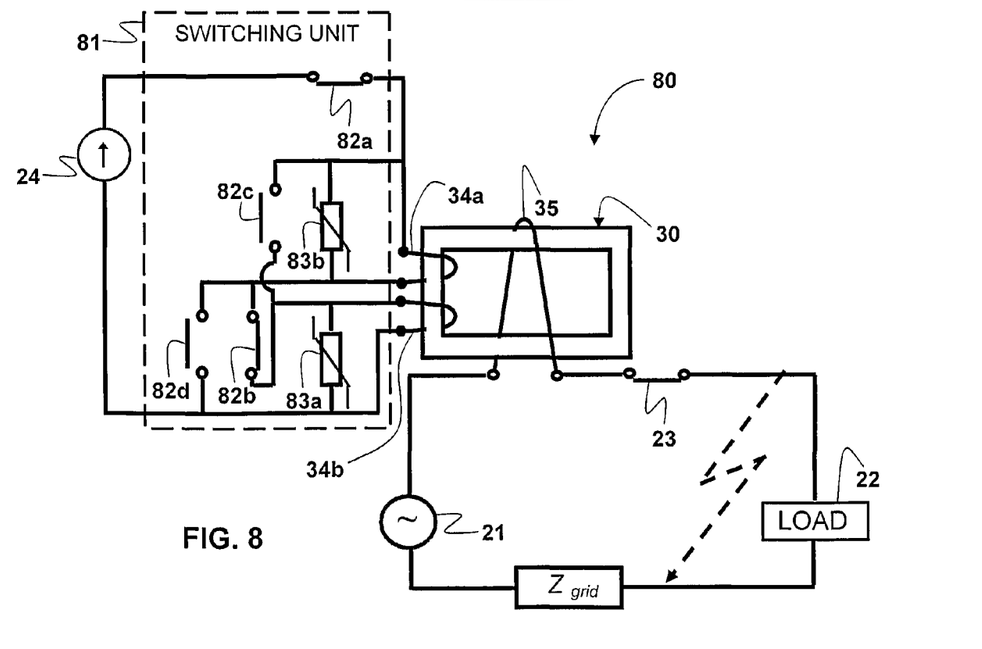
FIG. 8 is a schematic circuit diagram showing a single phase FCL according to an exemplary embodiment of the invention with a switching system for disconnecting power from the bias coils and reconnecting them in mutually opposed relationship during a fault condition.

FIG. 8 is an exemplary schematic circuit diagram showing a system 80 that includes the FCL 40 or 50 shown in FIGS. 4 and 5, respectively, having two DC coils 34a and 34b that are energized by a DC supply 24 via a switching unit 81. The switching unit 81 includes first and second fast transistor switches having normally closed contacts 82a, 82b and normally open contacts 82c, 82d and corresponding first and second energy absorbing elements 83a, 83b that limit maximal voltage in the electric circuit. Under fault conditions, the contacts 82a and 82b open thereby disconnecting the DC supply 24 from the DC bias coils 34a and 34b; while, at the same time, the contacts 82c and 82d close thereby connecting respective DC bias coils 34a and 34b in anti-phase so that the DC bias coils 34a and 34b are counter wound relative to each other in a way that the possible induced voltage on both DC coils and current therein are minimized. The energy absorbing elements 83a, 83b limit the voltage on each of the bias coils.

It will be understood that modifications are possible to the exemplary embodiments as described without departing from the scope of the invention as claimed. Thus, in the exemplary embodiments, a switching unit is used to disconnect the DC supply from the DC bias coils and thereby reduce the DC bias current to zero. Under these conditions, the AC fluxes in the opposing limbs of the magnetic core equal each other. However, the invention also contemplates reducing the DC bias current to less than zero. This will still work as at least half of the core's cross-section always is driven out of saturation by the AC coil current. Any reduction in the DC bias current adds to the effective cross-section participating in the limiting effect. Current reduction may be achieved using feedback, for example, as taught in WO 2004/068670 or using any other suitable method.

It will also be appreciated that the invention embraces any magnetic circuit forming an open magnetic core for at least one AC coil and forming a closed magnetic circuit for at least one superconducting bias coil that is adapted under non-fault conditions to bias the magnetic core into saturation so that each of the opposing limbs is saturated in opposite directions by the bias coil. Such a magnetic circuit has utility for a current limiting device independent of the switching unit, even though without reducing the DC bias current the efficiency would be lower. The term current reduction unit as used in the description and appended claims embraces any circuit for reducing DC bias current, whether the DC bias current remains non-zero or is disconnected altogether.

The invention claimed is:

1. A current limiting device for an AC supply, said current limiting device comprising for each phase of the AC supply:
a magnetic circuit forming an open magnetic core for at least one AC coil enclosing opposing limbs of the magnetic core and forming a closed magnetic circuit for at least one superconducting DC bias coil that is adapted under non-fault conditions to bias the magnetic core into saturation so that each of the opposing limbs is saturated in opposite directions by the bias coil.

2. The current limiting device according to claim 1, wherein the magnetic circuit includes:
a closed magnetic core having a first pair of opposing limbs and a second pair of opposing limbs,
at least one AC coil enclosing opposing limbs of the magnetic core and being adapted to be connected in series with a load, and
at least one superconducting DC bias coil enclosing at least one limb of the magnetic core and being adapted under non-fault conditions to bias the magnetic core into saturation so that each of the opposing limbs is saturated in opposite directions by the bias coil.

3. The current limiting device according to claim 2, including:
a single superconducting DC bias coil one limb of the first pair of opposing limbs, and
a single AC coil enclosing the second pair of opposing limbs.

4. The current limiting device according to claim 2, including:
a pair of superconducting DC bias coils each enclosing a respective limb of the first pair of opposing limbs, and
a single AC coil enclosing the second pair of opposing limbs.

5. The current limiting device according to claim 2, including:
a pair of superconducting DC bias coils each enclosing a respective limb of the second pair of opposing limbs, and
a single AC coil enclosing the second pair of opposing limbs.

6. The current limiting device according to claim 2, wherein the magnetic core includes:
first and second spaced apart C-shaped cores each having limbs whose respective open ends are magnetically coupled by respective legs,
a pair of DC bias coils each enclosing a respective one of the legs of the core,
a first AC coil enclosing opposite limbs of the first C-shaped core, and
a second AC coil enclosing opposite limbs of the second C-shaped core.

7. The current limiting device according to claim 1, further including a current reduction unit for reducing current in the at least one superconducting DC bias coil during a fault condition.

8. The current limiting device according to claim 7, wherein the current reduction unit is adapted to disconnect the at least one superconducting DC bias coil from the power supply during a fault condition.

9. The current limiting device according claim 7, wherein a respective energy absorbing element is connected across the at least one superconducting DC bias coil.

10. The current limiting device according to claim 7, wherein the current reduction unit is controlled by the voltage drop on the at least one AC coil so as to reduce current in the bias coils during a fault condition and restore current in the bias coils after the disconnection or termination of the fault.

11. A method for reducing mass of a current limiting device for an AC supply, said current limiting device comprising for each phase of the AC supply a magnetic circuit that offers low impedance under non-fault conditions and high impedance under fault conditions, said method comprising:
constructing the magnetic circuit so as to form an open magnetic core for at least one AC coil and forming a closed magnetic circuit for at least one superconducting DC bias coil that is adapted under non-fault conditions to bias the magnetic core into saturation so that each of the opposing limbs is saturated in opposite directions by the bias coil;
whereby under fault conditions some of the cross-sectional area of the magnetic core always exhibits high permeability and serves, thereby, to resist the fault and allow the cross-sectional area of the at least one AC coil and magnetic core to be reduced.

12. The method according to claim 11, further comprising:
reducing current in the at least one superconducting DC bias coil during a fault condition thereby bringing the at least one AC coil out of saturation and allowing a cross-sectional area of the AC coils and magnetic core to be reduced.

13. The method according to claim 11, including:
disconnecting the at least one superconducting DC bias coil from the power supply during a fault condition.

14. The method according to claim 12, wherein the magnetic circuit includes a pair of superconducting DC bias coils and there is further included:
connecting the superconducting DC bias coils in antiphase so as to minimize possible induced voltage across and current through the superconducting DC bias coils.

15. The method according to claim 11, further including connecting the at least one DC superconducting bias coil to a respective energy absorbing element.

* * * * *